United States Patent
Andres et al.

(10) Patent No.: US 9,342,206 B1
(45) Date of Patent: May 17, 2016

(54) FINGERPRINT LOCATION INDICATOR

(75) Inventors: Lillian K. Andres, Trenton, NJ (US); Valerie Underwood, Mount Laurel, NJ (US)

(73) Assignee: Lockheed Martin Corporation, Bethesda, MA (US)

( * ) Notice: Subject to any disclaimer, the term of this patent is extended or adjusted under 35 U.S.C. 154(b) by 1717 days.

(21) Appl. No.: 12/013,095

(22) Filed: Jan. 11, 2008

(51) Int. Cl.
*G06F 3/048* (2013.01)
*G06F 3/0481* (2013.01)
*G06F 17/30* (2006.01)
*G09B 29/00* (2006.01)

(52) U.S. Cl.
CPC .......... *G06F 3/0481* (2013.01); *G06F 3/04812* (2013.01); *G06F 17/30* (2013.01); *G09B 29/007* (2013.01)

(58) Field of Classification Search
CPC ... G06F 3/0481; G06F 3/04812; G06F 17/30; G09B 29/007
USPC .................................................. 715/764, 811
See application file for complete search history.

(56) References Cited

U.S. PATENT DOCUMENTS

| | | | | |
|---|---|---|---|---|
| 5,553,209 | A * | 9/1996 | Johnson et al. | 345/667 |
| 6,995,778 | B2 * | 2/2006 | Noble et al. | 345/632 |
| 7,522,996 | B2 * | 4/2009 | Jung et al. | 701/209 |
| 7,555,412 | B2 * | 6/2009 | Nath et al. | 702/188 |
| 7,676,754 | B2 * | 3/2010 | Basson et al. | 715/762 |
| 7,777,730 | B2 * | 8/2010 | Geurts et al. | 345/173 |
| 8,369,399 | B2 * | 2/2013 | Egnal et al. | 375/240.08 |
| 2008/0147311 | A1 * | 6/2008 | Zoller et al. | 701/201 |
| 2008/0163081 | A1 * | 7/2008 | Gillette et al. | 715/762 |
| 2010/0280700 | A1 * | 11/2010 | Morgal et al. | 701/29 |

* cited by examiner

*Primary Examiner* — Amy Ng
*Assistant Examiner* — Sajeda Muhebbullah
(74) *Attorney, Agent, or Firm* — Howard IP Law Group, P.C.

(57) ABSTRACT

Situational awareness map display information is generated at a location and populated with sensor information accessed via the Internet. The map display information is made available on the Internet. A remote browser-enabled display terminal accesses the map display information via the Internet, and displays the map and sensor information. A memory associated with the remote terminal is preloaded with fade information. At the remote terminal, a location icon is generated at the cursor location under control of a mouse click. The icon is faded at the stored fade rate. The icon may be a segmented circle surrounding the marked location. Fading may be by sequentially deleting one or more segments from the circle.

17 Claims, 7 Drawing Sheets

FINGERPRINT LOCATION INDICATOR

FIELD OF THE INVENTION

Background of the Invention

Figure 1:
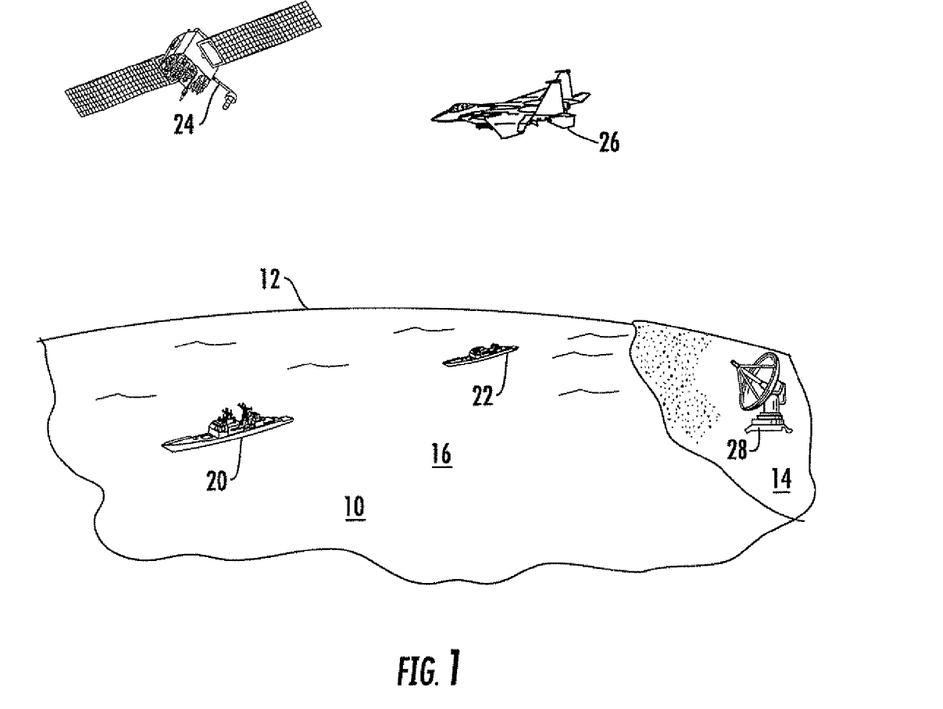
FIG. 1 is a simplified view of a region being monitored by a situational awareness system.

The United States Coast Guard is upgrading its situational awareness equipment. A situational awareness system named after the Coast Guard motto "Semper Paratis" (Always Ready) and known as "SemParView" is a distributed system in which remote users can access map information from a server by way of the internet. SemParView is now operational over a limited region, and is being expanded. FIG. 1 is a simplified illustration of a portion of a littoral (seashore) region populated by several assets such as vehicles or stations. In FIG. 1, the scenario 10 includes a horizon 12, a land mass designated generally as 14, and an ocean region designated generally as 16. Ships 20 and 22 float in ocean region 16, a spacecraft or Earth satellite 24 is placed to view the scenario, and an airplane flies over the region. At least ship 20, spacecraft 24, and airplane 26 carry one or more sensors. For example, ship 20 and aircraft 26 can carry scanning and tracking radar systems, and spacecraft 24 can carry an Overhead Non-Imaging Infrared Radar (ONIR) system. A land-based sensor is illustrated as 28, and may include a scanning or tracking radar system. The illustrated vehicles and stations are only by way of example. Many regions will have hundreds or even thousands of separate vehicles at some times. The sensors or location generating/receiving equipment available on the various vehicles and at the various stations will vary, and may include Automatic Identification Systems Antennas, Receivers, Transponders and various Satellite Navigation Systems, and Global Positioning System (GPS) enabled devices.

The information from the various sensors carried by vehicles and from the land-based sensors of FIG. 1 is made available on the Internet in known fashion, as by transmitting the information from each sensor or, more generally, from each vehicle, by way of communication satellites to one or more gateways. At the gateways, the information is made available to the Internet or web.

An aspect of the SemParView system is that it integrates the information from many sensors with a corresponding map, and makes the map and information available on-line, so that remote user terminals equipped with web browsers can access the map and associated information. Each user terminal can separately operate on the map and information.

Figure 2:
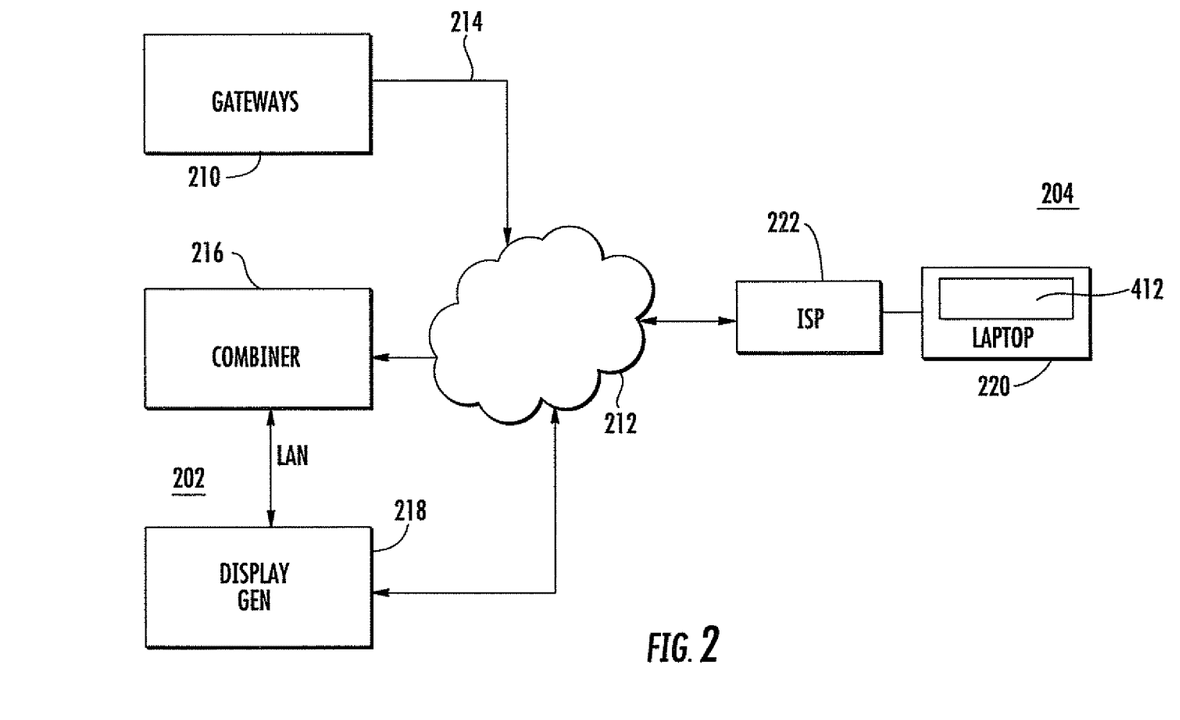
FIG. 2 is a simplified block diagram aiding in understanding of the operation of a prior art distributed situational awareness system.

FIG. 2 is a simplified block diagram of the SemParView system. In FIG. 2, one of a plurality of gateways is illustrated as a block 210. Gateway block 210 receives sensor information by a path (not illustrated), and makes the information available by an Ethernet path 214 to the Internet, illustrated as a cloud 212. The various pieces of information from gateway 210, and from other gateways (not illustrated) which may be similarly coupling information to the Internet 212, is received at an information combiner illustrated as a block 216. Combiner 216 combines the information from the various sensors and from a land mass map memory, and prepares the combined information for display. The preparation of the combined information for display may include the substitution of various icons for some of the sensed information. For example, sensed information consistent with the presence of a surface ship may be represented by a square icon. The combined information from combiner block 216 is made available by way of a Local Area Network (LAN) to a map display generator illustrated as a block 218. Display generator 218 represents software which, when accessed from a remote user terminal, displays the transformed and combined sensor information in the form of a map. The map display generator 218 has a Universal Resource Locator (URL) address on the Internet 212.

In FIG. 2, a representative one of many remote users, illustrated as a "laptop" block 220, wishing to access the SemParView system, communicates to the internet 212 by way of an internet service provider (ISP) 222. While a laptop computer is disclosed, the remote user terminal may be of any browser-capable type. The remote user communicates with the display generator 218 by invoking its URL, whereupon the map display is made available to the remote user terminal 220. Commands may be sent from the remote user terminal to the display block to access some of the available functions of the display generator, such as selection of the field of view or region which the map displays to the user terminal. Other available functions include zooming, enabling/disabling display of history tails on all vehicles or the selected vehicle, enabling/disabling display of direction vectors on all vehicles or the selected vehicle, enabling/disabling the view of predefined zones of interest.

As mentioned, many objects may be displayed by the map generator 218 of FIG. 2, depending upon the size of the region being displayed, on the traffic through the region, and the number of sensors distributed through the region. In many cases, ships may desire to access the map display, for which purpose they must have a computer with a web browser, and access to the Internet 212. It will often be the case that there will be a great deal of attention paid to the matter of the map display, as might be the case, for example, when a Coast Guard ship is out in bad weather, and performs monitoring to be aware of the surrounding situation.

Improved facilities are desirable for aiding personnel in monitoring a map display such as that of SemParView.

SUMMARY OF THE INVENTION

A method according to an aspect of the invention is for temporarily marking a location on a map display. The method comprises the steps of sensing information relating to targets in a region, and making the sensed information available on the Internet. At a first location, which may include a server, the sensed information is accessed by way of the Internet, and the sensed information is combined with map information relating to the region, to thereby generate map display information. The map display information is made available on the Internet. At a "remote" location remote from the first location, the map display information is accessed by way of the Internet with a browser-enabled display device. At the remote location, the map information on a first display layer is displayed. A mouse-controlled cursor overlying the first display layer is provided at the remote location. The cursor is set at a selected location on the display. A memory at the remote location is preloaded with information identifying a location icon fade rate. At the remote location, and with the cursor at the selected location, local generation of a location icon is commanded. In response to the command for local generation of a location icon, a local icon identifying the selected location is generated on a display superlayer relative to the first display layer. At the remote location, the local icon identifying the selected location at the icon is faded at the fade rate.

The step of generating a local icon identifying the selected location may include the step of generating a contrasting circle centered on the selected location. The circle so generated may comprise discontinuous segments, which may subtend angles of about 1°.

In a preferred method according to the invention, the step of fading is performed by deleting a previously non-deleted segment of the circle to produce a reduced array of segments, and repeating the step of deleting a previously non-deleted segment until all the segments are deleted. The repetition of the step of deleting may be performed at a selected or fixed clock rate.

DESCRIPTION OF THE INVENTION

The operator who views the SemParView map display on the screen of his web browser may be very busy. In addition to receiving input from the map display provided by SemParView, he may be in contact by radio with rescue crews and/or search aircraft, and with medical facilities. He may also be in communication with weather reporting services and police or other emergency services. In addition, he may receive telephonic messages relating to the need for rescue or interception.

Figure 3:
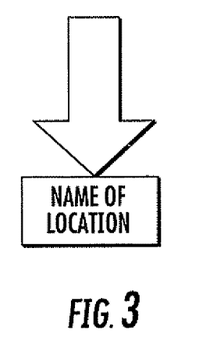
FIG. 3 is a notional illustration of a prior-art location icon or marker.

As an aid to the operator viewing a map display, an icon may be provided identifying a previously selected location or place of interest. In one prior art arrangement, namely Google Maps, the location of a desired address is indicated on the map by an icon such as that illustrated in FIG. 3, where the name of the location searched for appears in the box immediately below the arrow. Such an icon reminds the user of the location previously selected, and the icon stands out from the remainder of the map display to bring immediate attention to the icon. The "standing out" may be by virtue of distinctive color or shape, or both.

In the context of SemParView, the operator may be dealing with many places of interest in the same general time period. SemParView map display data generator 218 of FIG. 2 provides for icon generation at each location selected by the remote user. For example, if the remote viewer places a cursor at a particular location, the display generator can generate an icon marking the location in question.

When an operator of a situational awareness system has been at work for some period, a plurality of icons may begin to clutter the map display. The operator may have forgotten the nature or importance of the particular location, and can take steps to delete the now-unrecognized icon by sending an appropriate command to the map display generator 218. Thus, the remote user may choose to individually delete all the location identification icons. When the presence of many icons begins to interfere with the situational awareness function, the operator may choose to delete all the location identification icons. If there are many such icons, it may be undesirably time-consuming to individually select location identification icons, recollect their import, and selectively delete those no longer of interest. The time alternative is to delete all the location identification icons as a group, but this in turn presents the problem that it deletes all the recently placed icons as well as older, presumably less useful location identification icons.

According to an aspect of the invention, the remote user is provided with a facility for placing location identification icons on the displayed map, and for specifying at least one fade rate for the icons. Thus, icons can be placed on the displayed map at locations selected by the remote user, and these icons fade at a rate selected by the remote user.

Figure 4:
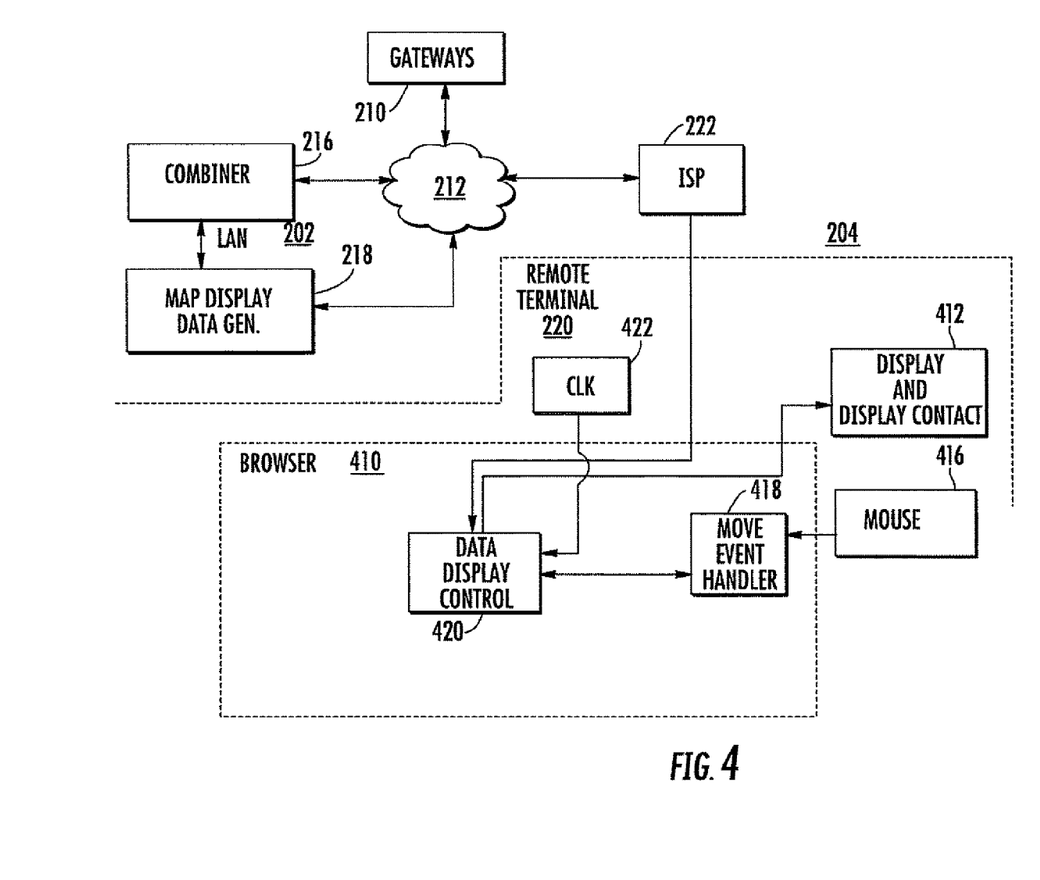
FIG. 4 is a simplified block diagram similar to that of FIG. 2 with details of the remote user terminal, including a data display controller.

In FIG. 4, the remote user terminal 220, which may be a laptop computer or any browser-enabled device, communicates with an internet service provider (ISP) 222. Remote terminal 220 includes a browser application illustrated as 410, which communicates by way of the ISP 222 and the internet 212 with the map display generator 218. Browser application 410 produces on a display 412 a map based on the map information generated at generator 218. Remote user 220 also includes user controls, such as a mouse 416, which communicates with a mouse events handler illustrated as a block 418. The mouse handler will ordinarily be in the form of software associated with the remote terminal 220. Mouse handler 418 communicates with the browser software 410 and performs several functions. One of the functions is to generate the commands which are sent to the map display generator 218 commanding the generation or deletion of place or location icons, which is a normal function of the SemParView apparatus. The commands may also include a command to zoom the map generated by map generator 218. SemParView also provides for many other commands from the remote location to the map generator.

According to an aspect of the invention, the remote terminal 220 also provides for local generation of icons at locations selected by the cursor. The mouse control 416 is manipulated to place the cursor at the desired location on the map displayed on the display screen 412. The remote user terminal 220 will normally include the function of generation of a mouse-controlled cursor. However, ordinary browser software does not include the function of generating an icon. In FIG. 4, the browser 410 includes a data display & controller illustrated as a block 420, which receives clock signals from a clock signal generator 422. Data display & controller 420 receives the map data from ISP 222 and displays the current map on display 412. The browser 410 commands refreshment of the map (or a new map) periodically to update track locations. The refresh period may be, for example, one second.

Data display and controller 420 also controllably generates a local icon at the cursor location specified by the mouse events handler 418, where the command is also produce by the mouse events handler 418. The mouse events handler may command the placement of a location icon in response to any command, most desirably in response to a mouse click.

Figure 5:
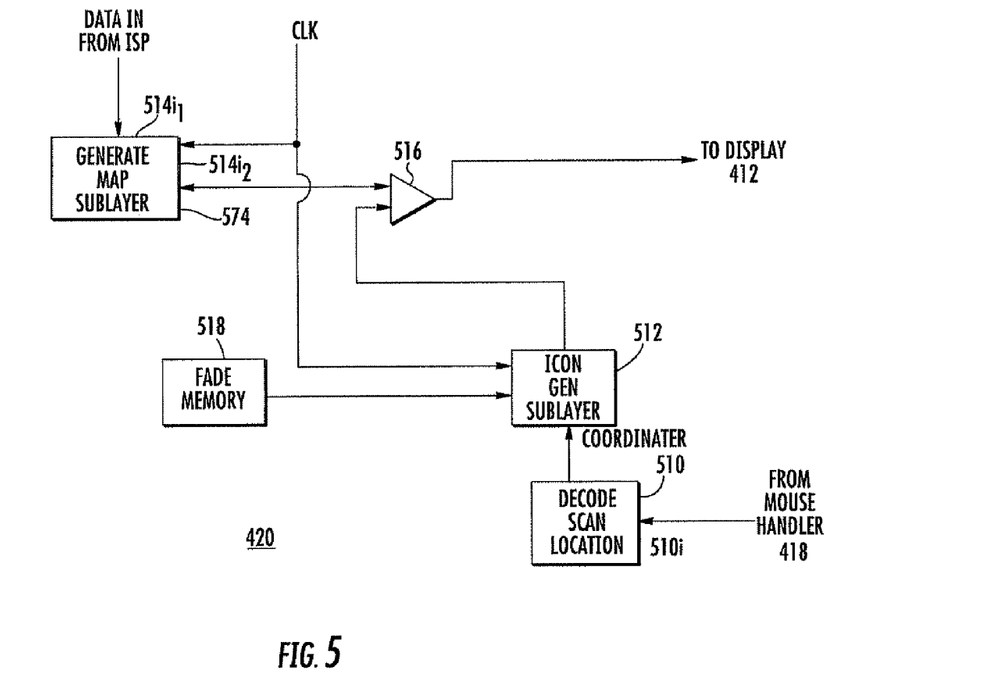
FIG. 5 is a simplified logic flow chart or diagram illustrating details of the data display controller of FIG. 4.

FIG. 5 is a simplified block diagram illustrating details of the data display and controller block 420. Data display control block 420 of FIG. 5 includes a map display generator 514 which receives map display information at a first port $514i_1$ from the map generator 218 of FIG. 2 by way of the ISP. Block 514 of FIG. 5 also receives clock signals at an input port $514i_2$. Map display generator 514 of FIG. 5 requests map signals from the map display generator 218 of FIG. 2 at the refresh rate, generates a map for display on a particular layer or sublayer of display, and makes the map available to display 412 by way of a through function represented in FIG. 5 as a coupler 516.

In FIG. 5, a scan or cursor location decoder 510 decodes the current location of the cursor, which current location is controlled by the mouse. The scan decoder 510 generates information about the location on the display of a local icon to be generated. Commands for generation of a local icon are received at a port 510i of scan location decoder 510 from mouse handler 418. The commands may be made in the form of a mouse click.

In FIG. 5, the icon is generated in icon generation block 512 as a superlayer relative to the layer of map data from block 514. The icon so generated is coupled through coupler 516 to the display and display controller arrangement 412 of FIG. 4. Since the locally generated icon is on a superlayer relative to the map data, the locally generated icon appears to be superposed on the map. Thus, the display and display controller 412 of FIG. 4 displays both the map layer and the icon layer, so the icon appears to be superposed over the map at the selected location.

The icon generator 512 of FIG. 5 accesses a preloaded fade memory 518. Fade memory 518 is preloaded with user-defined information relating to the rate at which the locally generated icon fades. Icon generator 512 receives clock signals from clock signal generator 422 (FIG. 4), and fades the icon at the selected rate.

Figure 6:
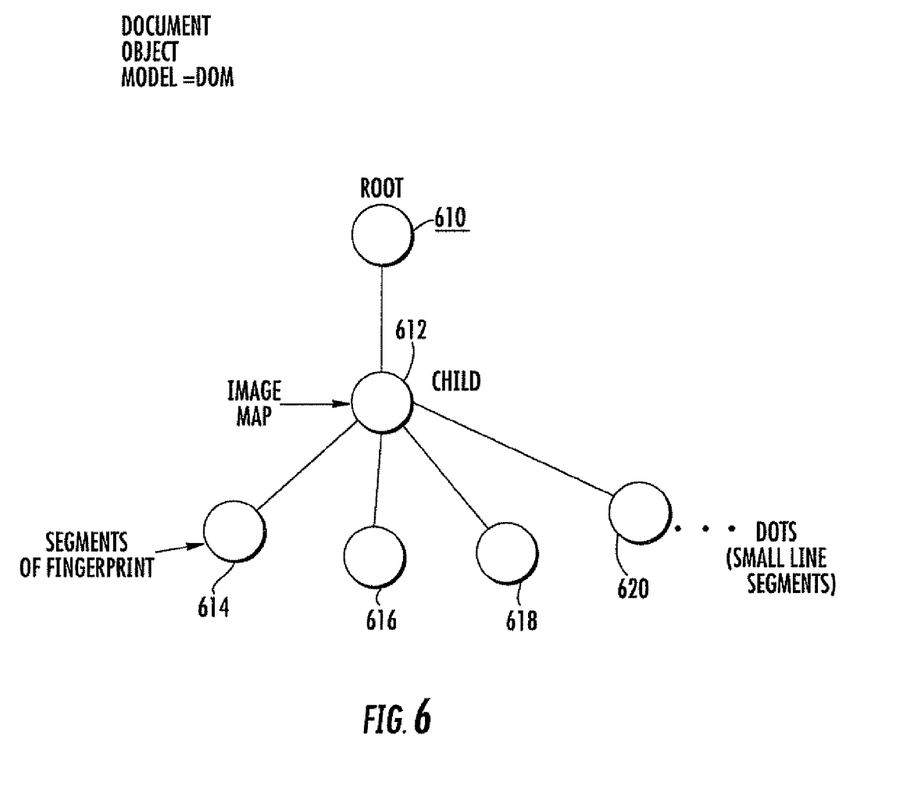
FIG. 6 is a document object model illustrating how the segments of the icon are generated.
Figure 7:
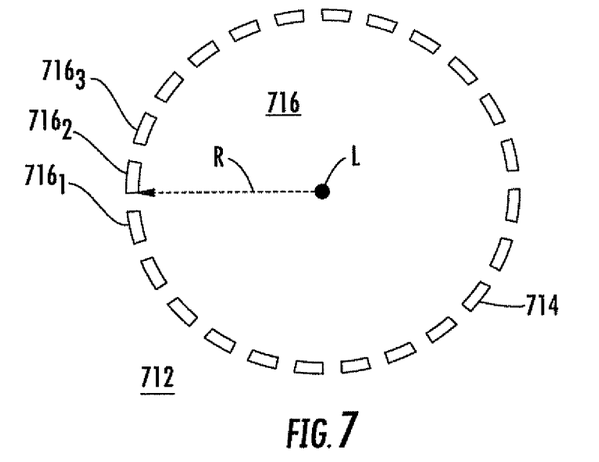
FIG. 7 is a simplified representation of the locally generated icon in the form of a circle composed of noncontiguous segments.

It has been found that an icon in the form of a circle surrounding the selected map (actually screen) location provides a very good quick identification of the location and is easy to use. Consequently, according to an aspect of the invention, the location icon is in the form of a white or contrasting dash-line or dotted-line circle surrounding the selected location. FIG. 6 represents a document object model of the icon which is generated. In FIG. 6, the root node 610 has one child node 612, which represents the underlying image map. The many child nodes 614, 616, 618, 620, . . . of node 612 represent the superlayer on which the segments of the icon are generated. Each segment of the icon is represented by a child node. Thus, child node 614 may represent a first segment of the circle icon, including several pixels extending or subtending an angle of, for example, 1° as seen from the map location being marked. The second child node 616 may represent a second 1° segment of the circle icon, which second segment is not contiguous with the first segment. Each of the other child nodes also represents a segment of the circle icon, also noncontiguous with the other segments. This combination of child nodes produces a dash-line circle icon centered on the icon location. Those skilled in the art will know how to make such a circle icon from FIG. 6 and the above description. Icon 712 of FIG. 7 represents an icon generated centered on a location L spaced by a radius R from the specified location L to be marked by the icon. As illustrated in FIG. 7, the icon 712 appears on a circle 714. The icon is composed of separate, noncontiguous or noncontacting segments designated generally as 716. Some of the segments included in the icon 712 are designated $716_1$, $716_2$, and $716_3$. Each segment may be selected to subtend any angle as measured from the center location L. As mentioned, a suitable angle is 1°. Each segment is separated from other segments by a non-contrasting or transparent portion of the superlayer in which the segments appear.

If each segment of the circle icon subtends 1°, as described for the example, and each segment is separated from adjacent segments by a 1° blank segment, there will be 360/2 active or illuminated segments in the icon.

According to a further aspect of the invention, the icon is faded at a user-specified rate. As mentioned, the specified rate is pre-stored in memory 518 of FIG. 5. The fading is accomplished in block 512 of FIG. 5 by deleting some of the child nodes, and then periodically deleting additional ones of the child nodes. It has been discovered that a particular deletion sequence provides a pleasant fade function. The desired deletion sequence is accomplished by deleting the ultimate child nodes 614, 616, 618, 620, . . . at a fixed rate. As the child nodes are deleted, the remaining array of child nodes becomes smaller, so the constant deletion rate operating on a progressively smaller array of nodes results in a deletion rate which gives the appearance of being more aggressive with increasing time.

The segments defining the icon are deleted beginning at a point on the circle, and proceeding in one of a clockwise and counterclockwise direction. Alternatively, the deletions may begin simultaneously at diametrically opposed locations on the circle, and similarly proceed clockwise or counterclockwise from the beginning locations.

Figure 8A:
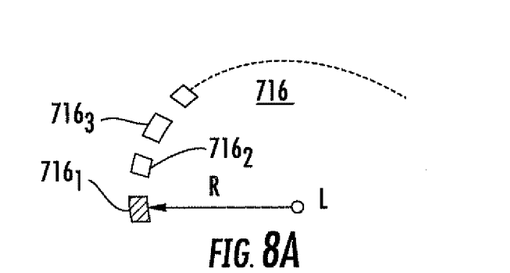
FIGS. 8A, 8B, and 8C together constitute a simplified notional illustration of how fading of the icon is accomplished.
Figure 8B:
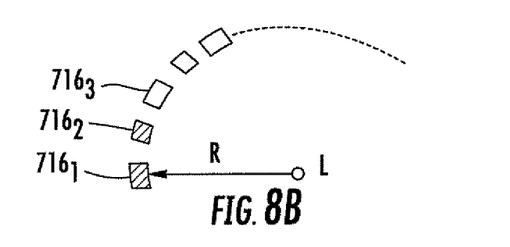
Figure 8C:
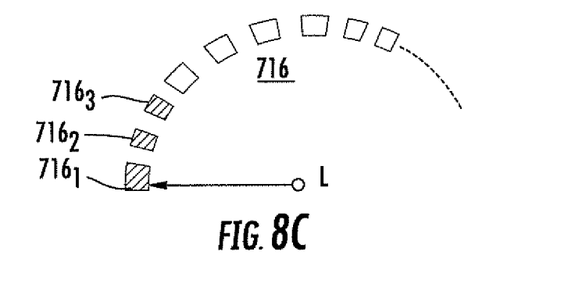

FIG. 8A is a simplified representation of a portion of a locally generated icon similar to icon 712 of FIG. 7, after a first step of the process of fading. In FIG. 8A, segment $716_1$ is deleted, as suggested by the hatching. The remaining segments of set 716 of segments are unchanged, as suggested by the lack of hatching. At a later time, defined by a selected number of clock cycles, a second one of the remaining segments is deleted. FIG. 8B represents the effect of this deletion. In FIG. 8B, segment $716_1$ is already absent or deleted, so the deleting function addresses extant adjacent segment $716_2$, as suggested by the hatching. The remaining segments are unchanged. The procedure continues, with FIG. 8C representing the next step, namely the deletion of the next one of the undeleted segments, namely segment $716_3$. The procedure continues until there are no more segments, at which time the icon is completely faded.

A method according to an aspect of the invention is for temporarily marking a location (L) on a map display. The method comprises the steps of sensing information relating to targets in a region (10), and making the sensed information available on the Internet (212). At a first location (202), which may include a server, the sensed information is accessed (216) by way of the Internet (212), and the sensed information is combined (212) with map information relating to the region (10), to thereby generate map display information. The map display information is made available on the Internet (212). At a "remote" location (204) remote from the first location (202), the map display information is accessed by way of the Internet (212) with a browser-enabled display device (screen 412 of remote terminal or laptop 220). At the remote location (204), the map display information is displayed on a first display layer of screen 412. A mouse-controlled (416) cursor (not separately illustrated) overlying the first display layer is provided at the remote location (204). The cursor is set at a selected location on the display (412). A memory (518) at the remote location (204) is preloaded with information identifying a location icon fade rate. At the remote location (204), and with the cursor at the selected location on the display, local generation of a location icon is commanded (by a mouse click, for example). In response to the command for local generation of a location icon, a local icon (712) identifying the selected location is generated on a display superlayer relative to the first display layer. Thus, the locally generated location icon overlies the underlying map. At the remote location (204), the local icon (712) identifying the selected location at the icon is faded (FIGS. 8A, 8B, 8C) at the fade rate.

The step of generating a local icon identifying the selected location may include the step of generating a contrasting circle (714) centered on the selected location (L). The circle (714) so generated may comprise discontinuous segments (716a, 716b, . . . ), which may subtend angles of about 1°.

In a preferred method according to the invention, the step of fading is performed by deleting a previously non-deleted segment of the segment circle array (716) to produce a reduced array of segments, and repeating the step of deleting a previously non-deleted segment until all the segments are deleted. The repetition of the step of deleting may be performed at a selected or fixed clock rate.

What is claimed is:

1. A method for temporarily marking a location on a map display, said method comprising the steps of:
   a) sensing information relating to presence of targets in a region including location data of said sensed targets;
   b) making said sensed data available on an internetwork;
   c) at a first location, accessing said sensed information with map information relating to said region thereby generating map display information;
   d) making said map display information available on said internetwork;
   e) at a second location remote from said first location, accessing said map display information by way of said internetwork with a browser-enabled display device;
   f) displaying said map display information on a first display layer on the display device at said second location;
   g) providing by a processor at said second location a cursor overlying said map display information on the first display layer on said display device at said second location, and receiving a selected map location selected using the cursor on said display device;
   h) commanding by the processor at said second location generation of a user-specified map location icon based on the received selected map location;
   i) in response to said command for generation of the user-specified map location icon,
   j) defining a document object model, wherein said document object model comprises a first node representing the first display layer containing the map display information and a plurality of child nodes of the first node representing a second display layer containing the user-specified map location icon, said plurality of child nodes defining said user-specified map location icon, wherein each child node includes a number of pixels representative of a segment of the user-specified map location icon; and
   k) at said second location, fading said user-specified map location icon at a user-specified fade rate, wherein fading said user-specified map location icon comprises eliminating at least one selected child node of said plurality of child nodes from said document object model at said user-specified fade rate by:
      i) deleting a previously non-deleted segment of said user-specified map location icon to thereby display a reduced array of segments, and
      ii) repeating said step of deleting a previously non-deleted segment until all said segments are deleted.

2. A method according to claim 1, wherein said step of generating said user-specified map location icon identifying said selected location comprises the step of generating a contrasting circle centered on said selected location.

3. A method according to claim 2, wherein said step of generating a contrasting circle comprises the step of generating a circle comprising discontinuous segments.

4. A method according to claim 3, wherein said segments subtend angles of about 1°.

5. A method according to claim 1, wherein said step of repeating said step of deleting is performed at a selected clock rate.

6. The method according to claim 1, further comprising:
   on said browser-enabled display device, performing the steps of:
      receiving in a map display generator, said map display information, and a clock signal;
      requesting map signals from said first location at a pre-determined refresh rate;
      generating a map from said requested map signals for display on a sublayer of a display of said browser-enabled display device;
      providing said generated map to said display of said browser-enabled display device via a coupler;
      receiving in an icon generator, information relating to a location of said display where said user-specified map location icon is to be generated and a second clock signal;
      generating in said icon generator, said user-specified map location icon in a superlayer relative to said sub-layer containing said generated map;
      accessing by said icon generator, from a pre-loaded fade memory, information relating to the user-specified fade rate; and
      providing said generated user-specified map location icon to said display of said browser-enabled display device via said coupler.

7. A method for temporarily marking a location on a map display, said method comprising the steps of:
   a) displaying a map on a display;
   b) providing a cursor overlying said map;
   c) setting said cursor at a selected map location relative to a target being tracked on said map;
   d) defining a document object model comprising a first node representative of a first display layer displaying said map, and a plurality of child nodes of the first node representing a second display layer containing a map location icon centered about the selected map location, each child node including a number of pixels of said display representative of a portion of the map location icon;
   e) displaying said map location icon on said displayed map at said selected location;
   f) associating a user-specified icon fade rate with said map location icon; and
   g) fading said map location icon at said user-specified icon fade rate by:
      i) deleting one of said portions of said map location icon to thereby display a reduced number of portions of the map location icon, and
      ii) repeating said deleting step until all portions of said map location icon are deleted.

8. A method according to claim 7, wherein said step of displaying said map location icon comprises the step of displaying a circle centered on said selected location.

9. A method according to claim 8, wherein said circle comprises an array of segments.

10. A method according to claim 7, wherein said step of repeating said deleting step is performed at the user-specified icon fade rate.

11. A method according to claim 7, wherein the map location icon comprises a plurality of separate, non-contiguous or non-contacting segments.

12. A system for temporarily marking a location on a map display, said system comprising:
   a) a display, and
   b) a processor executing instructions for performing the steps of:
   i) displaying a map and target location information associated with a target to be tracked on the display;
   ii) displaying a cursor overlying said map,
   iii) setting said cursor at a selected map location relative to the target on said map;
   iv) defining a document object model comprising a first node representative of a first display layer displaying said map, and a plurality of child nodes of the first node representing a second display layer containing a map location icon centered at the selected map location, each child node including a number of pixels of said display representative of a portion of the map location icon;
   v) displaying said map location icon on said map display at said selected location;
   vi) associating a user-specified icon fade rate with said map location icon; and
   vii) fading said map location icon at said user-specified icon fade rate, wherein said fading comprises eliminating at least one of the plurality of child nodes at said user-specified icon fade rate, and repeating said eliminating until all child nodes of said map location icon are deleted.

13. A system according to claim 12, wherein said step of displaying said map location icon comprises the step of displaying a circle centered on said selected location.

14. A system according to claim 13, wherein said circle comprises an array of segments.

15. A system according to claim 12, wherein said step of repeating said deleting step is performed at a predetermined rate.

16. A system according to claim 12, wherein said step of repeating said deleting step is performed at the user-specified icon fade rate.

17. A system according to claim 12, wherein said map location icon comprises a plurality of segments, each segment of said plurality of segments being spaced from adjacent segments by a non-contrasting or transparent portion of the display.

* * * * *